(12) United States Patent
Johnson et al.

(10) Patent No.: US 7,649,473 B2
(45) Date of Patent: Jan. 19, 2010

(54) PHYSICALLY SEGMENTED LOGICAL TOKEN NETWORK

(75) Inventors: Monte Johnson, Orem, UT (US); David Bartholomew, Springville, UT (US)

(73) Assignee: IntelliServ, Inc., Provo, UT (US)

( * ) Notice: Subject to any disclaimer, the term of this patent is extended or adjusted under 35 U.S.C. 154(b) by 368 days.

(21) Appl. No.: 11/674,815

(22) Filed: Feb. 14, 2007

(65) Prior Publication Data

US 2007/0189165 A1 Aug. 16, 2007

Related U.S. Application Data

(60) Provisional application No. 60/766,875, filed on Feb. 16, 2006, provisional application No. 60/775,152, filed on Feb. 21, 2006.

(51) Int. Cl.
*G01V 3/00* (2006.01)
*G08C 19/16* (2006.01)
*H04L 12/28* (2006.01)
*H04L 12/42* (2006.01)

(52) U.S. Cl. .............. 340/853.1; 340/870.01; 370/395.53; 370/450

(58) Field of Classification Search ........ None
See application file for complete search history.

(56) References Cited

U.S. PATENT DOCUMENTS 4,972,437 A * 11/1990 Citron et al. ............... 375/259
5,093,828 A * 3/1992 Braun et al. ................ 370/451
5,959,547 A * 9/1999 Tubel et al. ............... 340/853.2
2002/0064163 A1 5/2002 Fujiyama et al.
2004/0062259 A1* 4/2004 Jeffries et al. ............. 370/412
2005/0035874 A1* 2/2005 Hall et al. ................ 340/853.1
2005/0207440 A1* 9/2005 Tyan et al. ................. 370/454
2005/0285751 A1 12/2005 Hall et al.
2006/0007939 A1* 1/2006 Elangovan ............ 370/395.53
2006/0086497 A1* 4/2006 Ohmer et al. ........... 166/250.01
2006/0145889 A1* 7/2006 Rawle et al. ............. 340/853.1

FOREIGN PATENT DOCUMENTS

EP 0096097 A1 12/1983
EP 0381386 A2 8/1990
EP 0631411 A2 12/1994

OTHER PUBLICATIONS

European Search Report for Application No. 07250670.2; "Documents Considered to Be Relevant;" Dated Aug. 9, 2007.
International Organization for Standardization: "Information Processing Systems—Local Area Networks—Part 4" Jul. 19, 1990.

* cited by examiner

*Primary Examiner*—Huy D Vu
*Assistant Examiner*—Brandon Renner
(74) *Attorney, Agent, or Firm*—Victor Segura; Daniel P. Nelson

(57) ABSTRACT

Token authorized packet exchange between a plurality of store-and-forward nodes in a downhole networking environment and respective applications for data processing and communication are described herein.

15 Claims, 10 Drawing Sheets

US 7,649,473 B2

PHYSICALLY SEGMENTED LOGICAL TOKEN NETWORK

CROSS REFERENCE TO RELATED APPLICATIONS.

This application is a non-provisional application of provisional application 60/766,875, filed Feb. 16, 2006, entitled "Physically Segmented Logical Token Network" and provisional application 60/775,152, filed Feb. 21, 2006, entitled "Node Discovery in Physically Segmented Logical Token Network", and claims priority from both provisional applications. Both of the above referenced provisional patent applications are hereby incorporated by reference herein for all they disclose.

BACKGROUND OF THE INVENTION

1. Field of the Invention

Embodiments of the present invention relate to the fields of data processing and data communication. More specifically, embodiments of the present invention relate to methods and apparatus for data communication in a downhole networking environment.

2. Background and Description of the Related Art

Advances in data processing and data communication technologies have led to development of a wide variety of data communication arrangements, including but not limited to various on-chip, on-board and system buses, as well as local and wide area networks. These data communication arrangements are deployed in a wide range of applications, including but not limited to data communications in harsh environments, such oil and gas exploration.

As electronic exploration and drilling technology matures, the need to accurately communicate data with components located in a downhole tool string is vital to continued success in the exploration and production of oil, gas, and geothermal wells. Downhole tool string configurations often incorporate multiple downhole drilling and exploration devices for reporting temperature, pressure, inclination, salinity, and other factors at or near real-time to the surface.

Unfortunately, a variety of factors including formation fluids, drilling mud, stress corrosion, and erosion from cuttings may contribute to drill string corrosion. Due to the corrosive and mechanically violent nature of a downhole drilling environment, a variety of these factors make the task of providing a commercially acceptable downhole network for bidirectional communication between the surface and the components in the drill string difficult for the industry to overcome.

Additionally, the longer the downhole drilling string and/or the more tools or components attempting to share data with the surface, the more difficult the task becomes. For example, with the additional components, allocation of available bandwidth of the communication channel becomes a significant design issue. Moreover, the relative reliability and availability of the network to the components in the downhole tool string are also significant design issues. Once network connections have been established, a communication failure resulting at any point along the drill string may interrupt or break the transmission path and the corresponding flow of data.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION AND THE PREFERRED EMBODIMENT

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily all refer to the same embodiment, but it may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Figure 1:
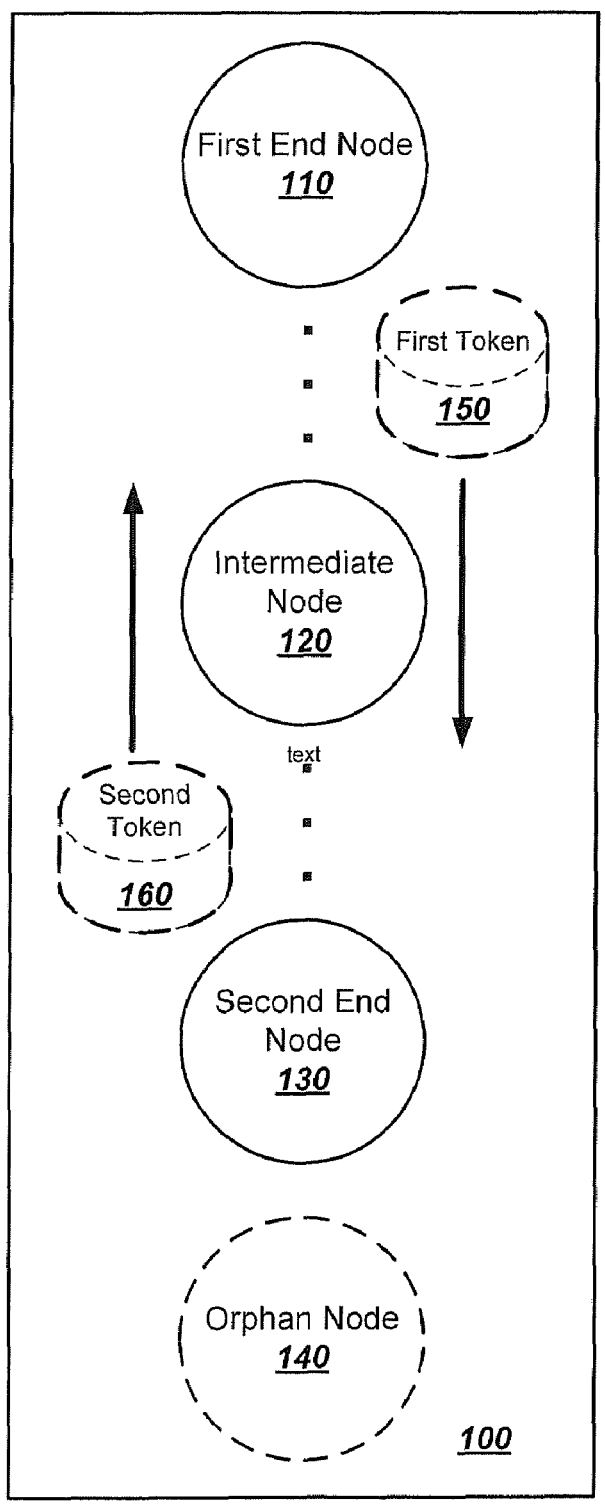
FIG. 1 illustrates a block diagram of a data communication arrange in accordance with various embodiments of the present invention.

Referring to FIG. 1, a data communication arrangement, according to at least one embodiment, includes a network 100 having nodes 110, 130, and one or more nodes 120. Nodes 110 and 130 are the end nodes of network 100, and may be referred to as the first and second end nodes of network 100. One or more nodes 120 are disposed in between nodes 110 and 130, and may be referred to as intermediate nodes. Nodes 110, 120 and 130 are serially connected to each other and using, e.g., cable segments, with the one closest to node 110 directly connected to node 110, and the one closest to node 130 directly connected to node 130. Thus, network 100 may be referred to as a physically segmented communication arrangement. Further, as will be described more fully below, in various embodiments, nodes 110, 120 and 130 communicate with each other substantially as agents coupled to a bus. Thus, for these embodiments, network 100 may also be referred to as a physically segmented logical bus.

Figure 8:
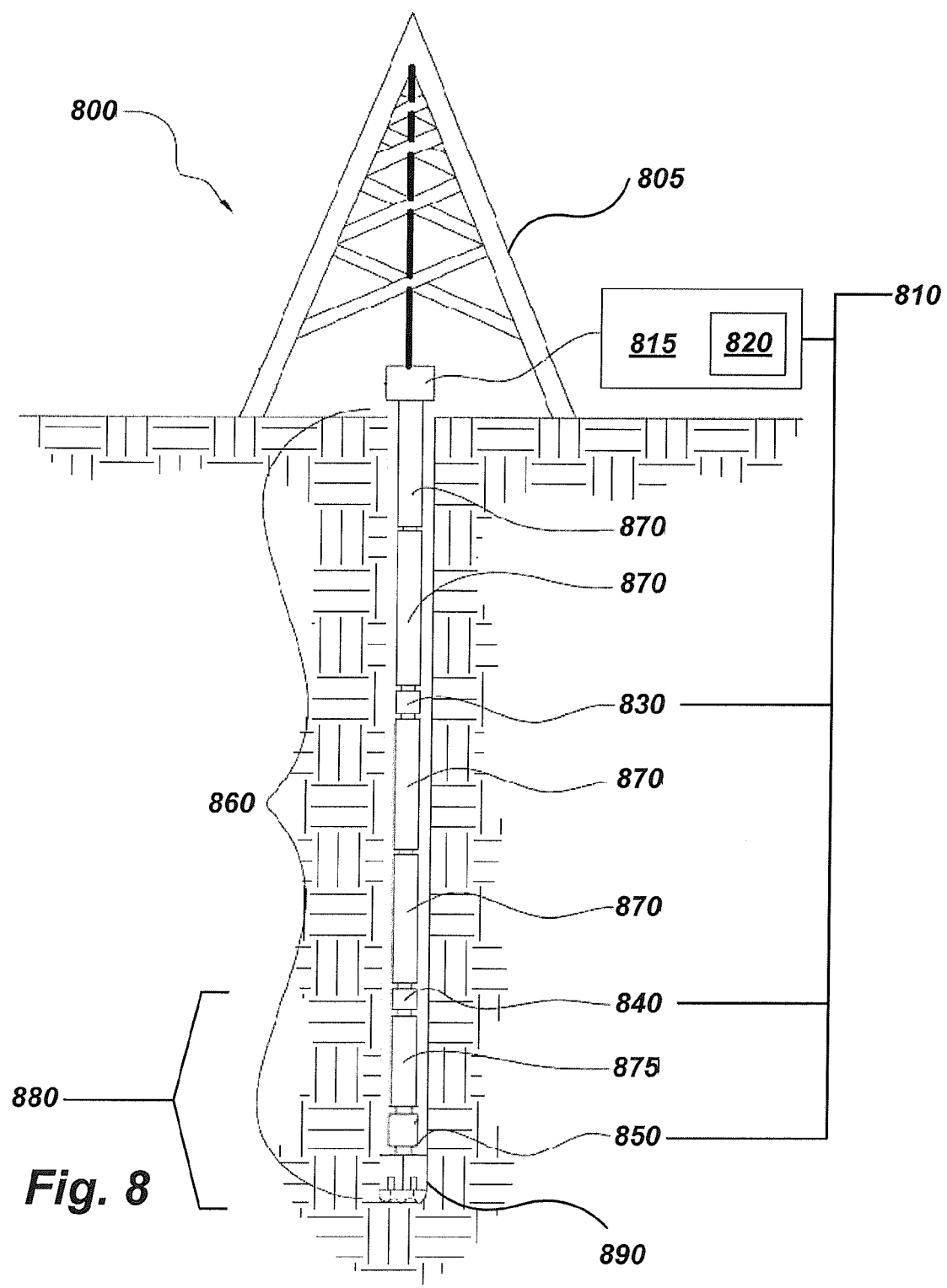
FIG. 8 illustrates a downhole networking environment suitable for practicing various embodiments of the present invention.
Figure 10:
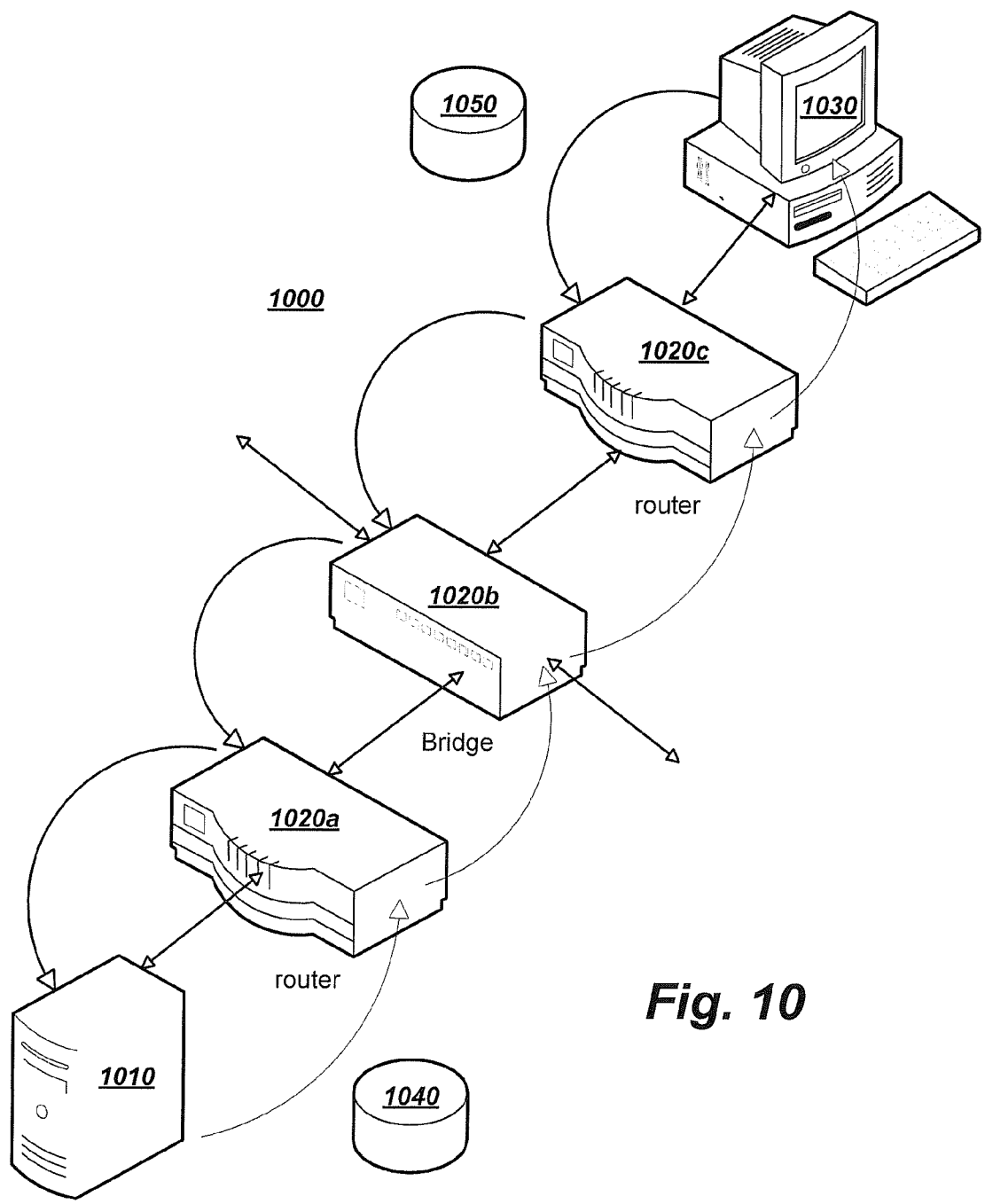
FIG. 10 illustrates another networking environment suitable for practicing various embodiments of the present invention.

In one embodiment, the network 100 is a hierarchal physically segmented logical token chain/bus downhole network as shown in more detail in FIG. 8. Alternative network configurations or portions thereof, such as the network shown in FIG. 10, may also fall within the scope of various embodiments.

In various embodiments, each of the nodes may be similarly constituted, and operate in accordance with one of at least three operational states depending on the relative placement of the node within the network 100 including, for example, a first end node 110, at least one intermediate node 120, and a second end node 130.

In various embodiments, a node 110, 120 or 130 may also be adapted to temporarily operate as an orphan node 140, e.g., awaiting for reconnection for a time period, when it is disconnected from the network. For example, first end node 110 or first end node 130 may be temporarily disconnected from network 100, and thus temporarily operates as an orphan node during the temporal disconnection. In various embodiments, the nodes may also be adapted such that the intermediate node 120 that was previously connected to the first/second end node 110/130 may operate as a "substitute" and/or "new" first/second end node when the first/second end node previously connected to the intermediate node 120 is temporarily non-responsive and/or disconnected from network 100.

In various embodiments, the first end node 110, the second end node 120, and the at least one intermediate node 130 employ at least a first token 150 and a second token 160 to facilitate data communication among the connected nodes.

In various embodiments, the tokens are used to direct how the different nodes in the network 100 communicate. In one embodiment, the tokens are employed to equalize the number of transmission opportunities afforded to each network node. Alternatively, the tokens may also be employed to skew the number of transmission opportunities afforded to each node type. For example, in a skewed transmission configuration the network 100 may use a single token to pass from the first end node 110 to the second end node 130 and back again to the first end node 110 so that the end nodes are only afforded one opportunity to transmit, but the intermediate nodes are allowed to transmit twice. Alternatively, the tokens could be skewed to allow only the end nodes to transmit data.

In one embodiment seeking to equalize the number of transmission opportunities for each node, a first token 150 is serially passed to each of the serially connected nodes of the network 100 to provide an opportunity for each node to claim the first token 150 thereby obtaining authorization to selectively transmit nodal data to the other connected nodes in the network 100. In one embodiment, the nodal data is data waiting at the node to be transmitted by the node and may represent data collected, generated, and/or received previously at the node.

In various embodiments, except first and second end nodes 110 and 130, each intermediate node 120 is adapted to transmit nodal data in both directions, i.e., to both neighboring nodes, upon obtaining authorization to transmit. For these embodiments, since each of first and second end nodes 110 and 130 has only one neighboring node, both nodes 110 and 120 transmit only in one direction, to its directly connected intermediate node 120.

For example, a first end node 110 may be adapted to generate and transmit the first token 150 to the immediately coupled intermediate node 120 along with any first end node nodal data to start an iteration of data communication where a first token 150 is successively passed from the first end node 110, through the one or more intermediate nodes 120, to the second end node 130. An iteration of data communication as described herein represents the process of providing each node with an opportunity to claim a token, which selectively authorizes data transmission by the node to other nodes, as the token passes from a first end node, through the one or more intermediate nodes, to a second end node.

In various embodiments, a node, upon claiming the first token 150, will transmit data originally transmitted together with the claimed token to the next node without the token. This modified transmission is then followed by a new transmission from the node of the previously claimed token and the nodal data to the two immediate neighboring nodes. In various embodiments, only the successor node of an intermediate node (i.e., the immediate neighboring node towards second end node 130) can claim the first token included in this "new" transmission, to create another opportunity to transmit nodal data. The predecessor node (i.e., the immediate neighboring node towards first end node 110) will merely pass the first token and the data to its predecessor node.

Thus, for these embodiments, starting with first end node 110, each successive node 120, and eventually second end node 130, will successively have an opportunity to transmit nodal data. Further, for these embodiments, the transmitted nodal data will in due course be seen by each node of the network, regardless whether a node is a targeted recipient of the transmitted data or not, as if the nodes are agents of a bus (notwithstanding the fact that the nodes are not physically connected to common data transmission lines).

Nodal data as referenced in the specification is generally data waiting at and/or transmitted from one specific node to other nodes, once the specific node claims the first token (e.g., a down-token in a downhole network). As described earlier, nodal data is often transmitted by an intermediate node in both directions along the network. In one embodiment, once the nodal data is transmitted to another node, it simply becomes received data to be passed along the network. In contrast to nodal data, the received data is simply stored in the intermediate node for further analysis and a duplicate copy is forwarded by the intermediate node to the next node. Thus, for these embodiments, the nodes may also be referred to as store and forward nodes.

While the first token 150 is employed to successively authorize the nodes to transmit data, the second token 160 is employed to restart the process again, once each node has been given an opportunity to claim first token 150 to transmit nodal data (i.e. first token 150 having reached second end node 130). The second token 160 is originated and passed from the second end node 130 back to the first end node 140. Unlike first token 150, second token 160 is passed from second end node 130, through intermediate node(s) 120, to first end node 110, without being claimed by any intervening node 120. In various embodiments, the second token 160 is passed along with nodal data from the second end node 130 to the first end node 110, via the at least one intermediate node 120 without modification of the data and/or second token.

In various embodiments, transmission of tokens is effectuated by including the tokens in the data packets, in particular, headers of the data packets. In various embodiments, claiming of tokens is effectuated by modifying the headers of the data packets to effectuate removal of the tokens from the headers. In alternate embodiments, other techniques may be employed to transmit and claim tokens.

Of course, embodiments are not limited to the token-passing protocol as described and shown. In fact, many possibilities exist for specific embodiments of token-passing protocols along the network 100. For example, the token could be passed sequentially to each node 110, 120, 130 starting in the first node 110 and ending at the second end node 130 and then back up the network 100 starting in the second end node 130 and ending in the first end node 110. The cycle of sequential rotation may then repeat itself as many times as are needed. In such an embodiment, the at least one intermediate node 120 would receive twice as many opportunities to transmit data on the network 100 than the end nodes 110 and 130, but there may be specific applications in which that particular characteristic is desirable. Alternatively, a network may also be envisioned where only certain nodes are allowed to transmit data and other nodes are limited to receiving and re-transmitting the data. In yet another alternative configuration, the network may assign dynamic priority levels to various nodes based in part on the information being transmitted and/or the designated collection priorities of the network.

Other embodiments may include the consideration of additional variables as criteria which must be met before a node 110, 120, 130 is permitted to claim a circulating token. For example, data ready to be transmitted on the network 100 may be assigned a priority level indicative of their relative importance compared to other data waiting at other nodes to be transmitted. In cases where it is more urgent to transmit some data on the network 100 than other data, the protocol may dictate that only a node 110, 120, 130 with data to transmit that has been assigned a certain priority level or higher may claim the token when an opportunity to claim the token arises.

In addition to the previously described configurations, several other different network configurations are possible including, for example, one embodiment where only one intermediate node 120 is used, the only one intermediate node 120 being immediately coupled to both the first end node 110 and the second end node 130. Alternatively, in one embodiment, the only one intermediate node 120 and the second end node 110 are the same node and are immediately coupled to the first end node 110.

Figure 2:
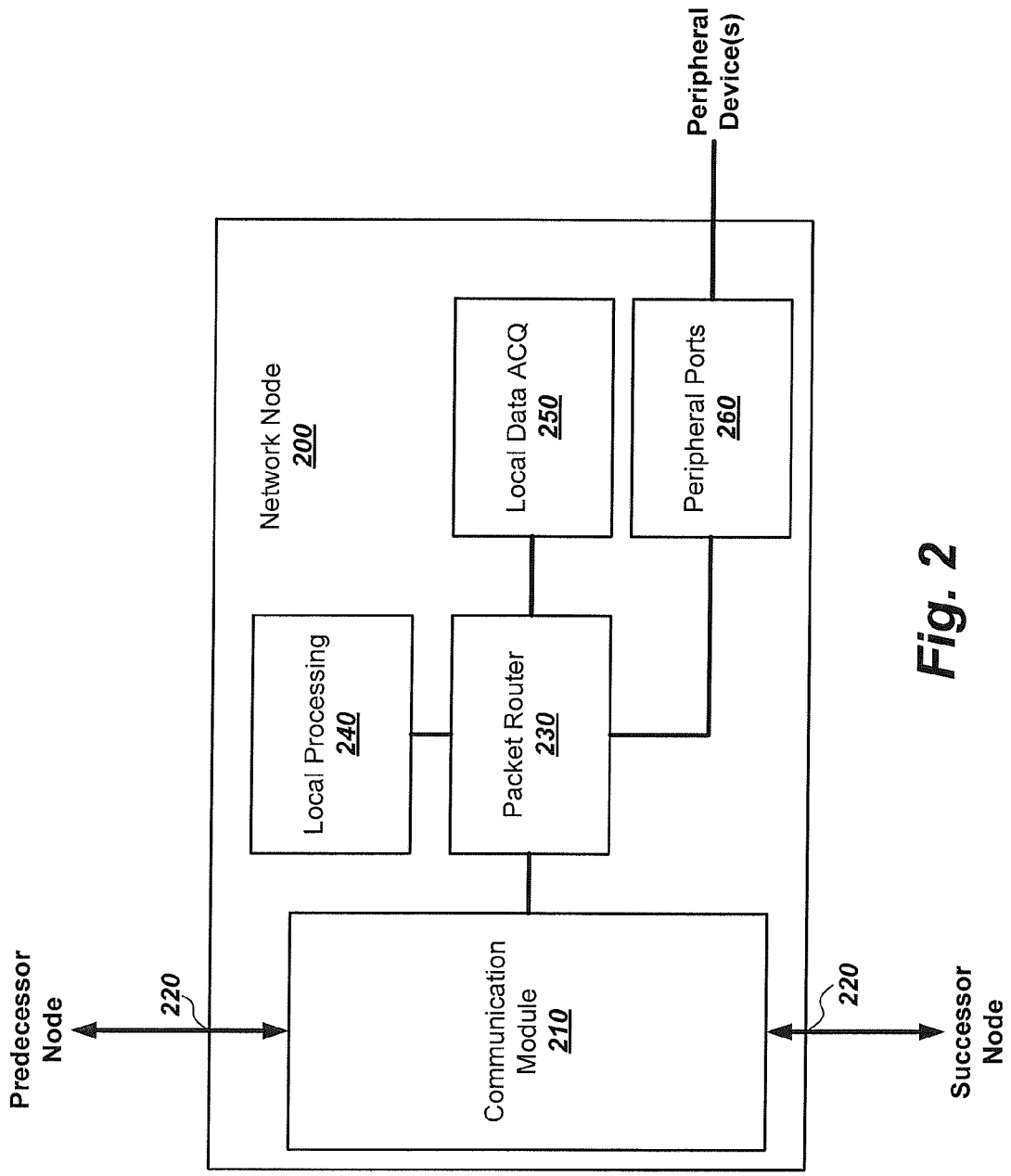
FIG. 2 illustrates a block diagram of a network node of FIG. 1, in accordance with various embodiments of the present invention.

Referring now to FIG. 2, a block diagram of a network node 200 having at least one communication interface 220 and a communication module 210 for use in the previously described network 100, in accordance with various embodiments, is shown. The illustrated communication module 210, such as a modem, is connected to the network 100 in at least two directions. However, in alternate configurations the communication module 210 may only be connected to the network 100 in one direction. The communication module 210 may modulate digital bits on an analog signal to transmit data packets from the network node 200 on the network 100 and demodulate analog signals received from the network 100 into digital data packets. In one embodiment, the communication module 210 may also send digital bits without modulation. For example, the unmodulated digital bits may be sent to tools or other components coupled to the networking node 200.

The network node 200 may comprise a packet router 230 that receives packets from the communication module 210 and forwards them to one or more of a local processing module 240, a local data acquisition module 250, or a peripheral port 260. Packets to be transmitted on the network 100 may also be forwarded to the communication module 210 from the packet router 230.

Turning now to FIGS. 3-7, the particular methods of the invention, in accordance with various embodiments, are described in terms of computer firmware, software, and hardware with reference to a series of flowcharts. In various embodiments, portions of the operations to be performed by network devices may constitute state machines or computer programs made up of computer-executable instructions. Describing portions of the operations by reference to a flowchart enables one skilled in the art to develop programs including instructions to carry out the illustrated methods on suitably configured network devices (e.g., a processor of the network device executing instructions from a computer-accessible media).

In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the embodiments as described herein.

Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or a produce a result.

Figure 3:
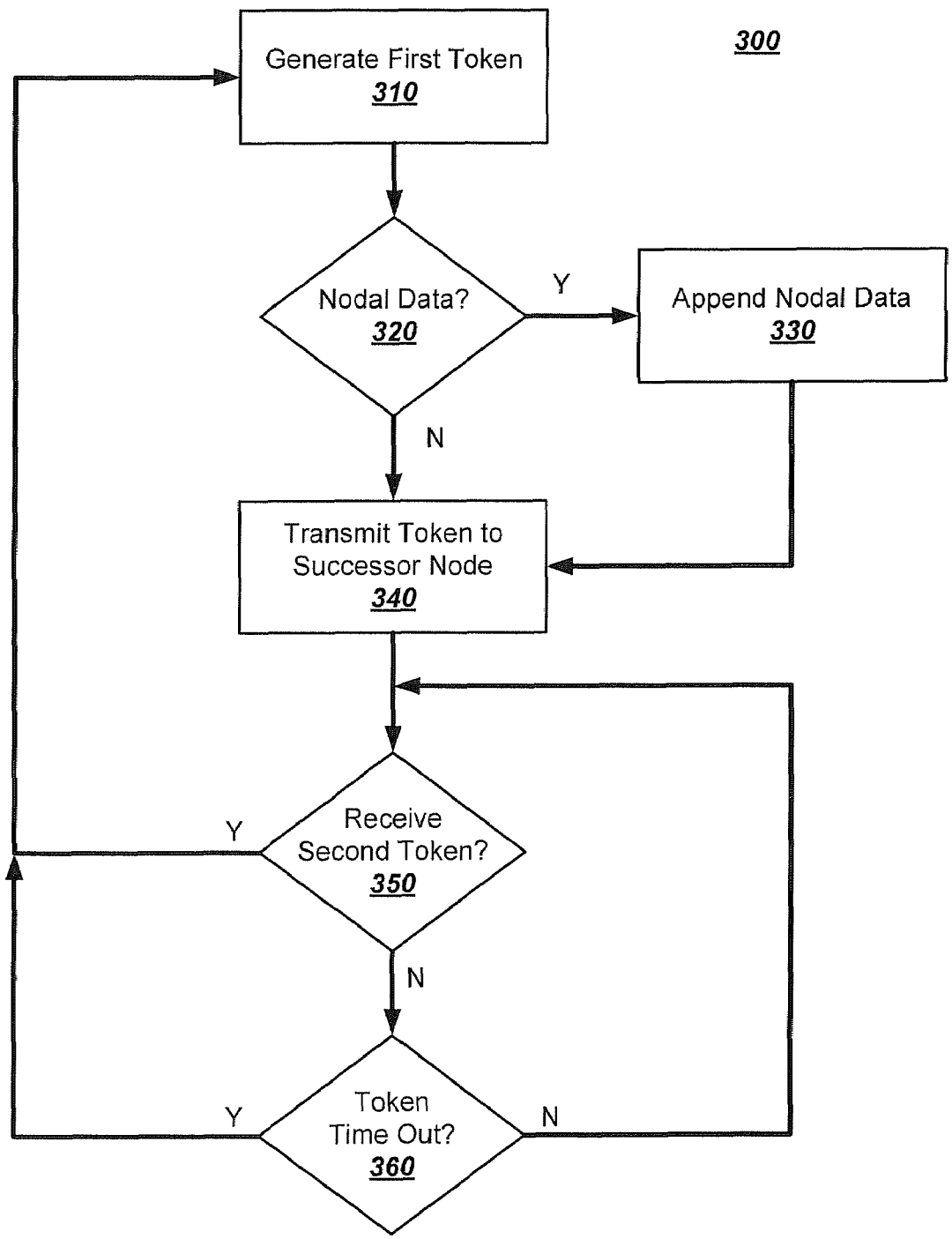
FIG. 3 illustrates a flowchart view of a portion of the operations of a first end node as presented in FIG. 1 in further detail, in accordance with various embodiments.

Referring to FIG. 3, a flowchart of a portion of the operations of a first end node 300 in accordance with various embodiments is shown. In block 310, the first end node 300 generates a first token. The first end node 300 determines whether nodal data is available to be transmitted with the first token in query block 320. If nodal data is available, then the first end node 300 appends the nodal data to the packet for transmission with the token in block 330. In one embodiment, the process of transmitting nodal data from the first end node includes combining the nodal data and the first token into a single data packet to be transmitted together to a successor node in block 340. Alternatively, if the first end node 300 does not have any additional nodal data to transmit, the token may be transmitted without first end nodal data to a successor node in block 340.

In query block 350, the first end node 300 determines whether a second token has been received. Upon receipt of the second token, query block 350 directs the first end node 300 back to block 310 to generate another first token. Alternatively, if the second token has not been received, query block 360 determines whether a time-out threshold has been reached for delivery of the second token. In one embodiment, the time-out threshold is a variable time period based in part on the number of nodes in the network. The threshold may also be based in part on various other factors such as the potential size of packets being transmitted, the potential latency between a packet being received at a node and the transmission of the packet to the next node, and whether other packets have been received at the first end node 300 since the previous first token was previously transmitted in conjunction with block 340.

Once the time-out threshold is reached, query block 360 directs the operations of the first end node 300 to generate the first token in block 310. In one embodiment, query block 360 may be implemented using a timing device with a timer configured to countdown to zero from a max response time. In this configuration the timer may be reset each time a packet is received by the first end node or in the alternative each time a token is received. Prior to reaching the time-out threshold, the first end node 300 continues to wait for either the arrival of the second token at query block 350 or the expiration of a time-out timer associated with the token in query block 360.

Figure 4:
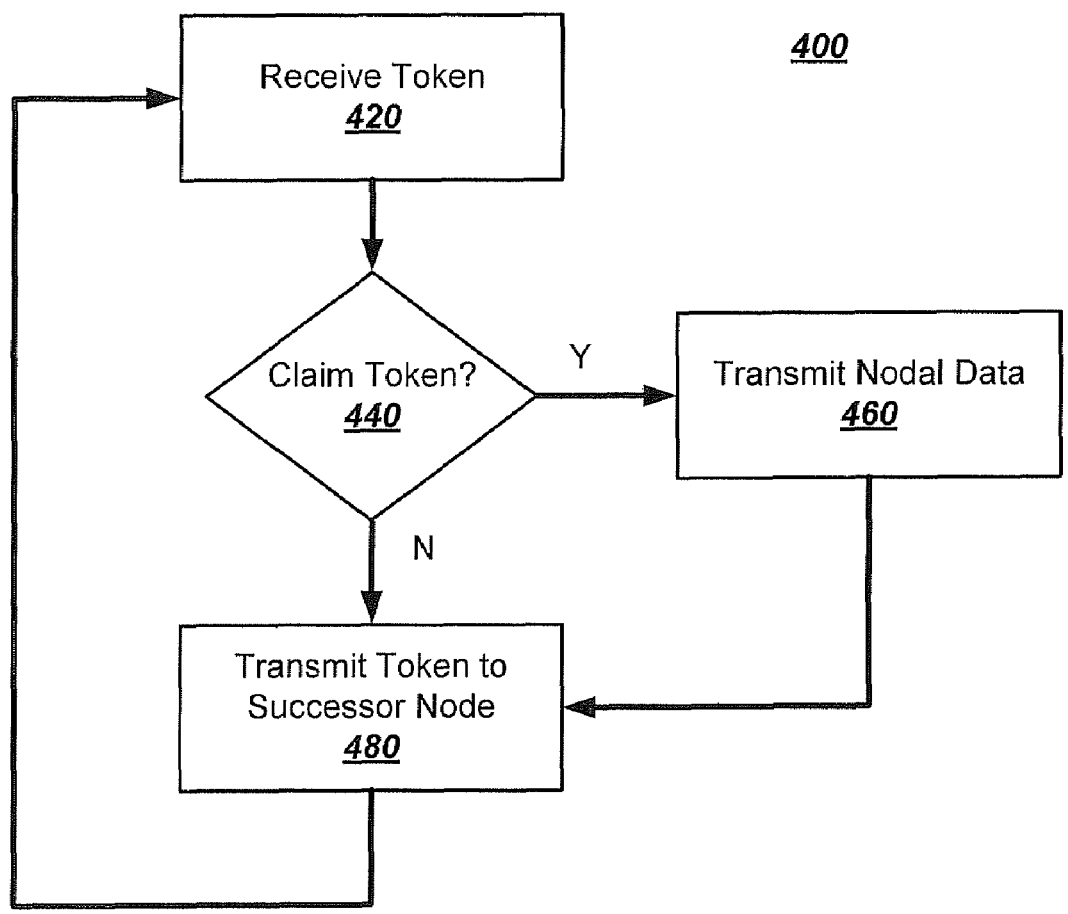
FIG. 4 illustrates a flowchart view of a portion of the operations of an intermediate node as presented in FIG. 1 in further detail, in accordance with various embodiments.

Referring now to FIG. 4, a flowchart of a portion of the operations of an intermediate node 400 in accordance with various embodiments is shown. The intermediate node 400 receives a token in block 420. In one embodiment, a first token may be received from an immediately coupled predecessor node in the physically segmented logical token network and a second token may be received from an immediately coupled successor node in the physically segmented logical token network. As such, the tokens, in a downhole network, may either be received from an immediately coupled node physically positioned above or below the intermediate node. Upon receiving the token, query block 440 determines whether intermediate node 400 may claim the token (e.g., for earlier described embodiments, whether the token is a first token 150). In one instance, query block 440 determines whether the token may be claimed and whether the intermediate node 400 has additional nodal data to transmit to the other nodes in the physically segmented logical token network. In one embodiment, certain tokens (such as token 160) may not be claimed by an intermediate node regardless of whether nodal data needs to be transmitted. Once query block 440 determines that the token may be claimed and that the intermediate node 400 has nodal data to be transmitted block 460 claims the token and transmits the nodal data. If query block 440 determines that the token may not be claimed by the intermediate node 400, (e.g., the token is a second token 160) then block 480 transmits the unclaimed token to a next node different from the node from which the token was received.

As with the top end node in FIG. 3, the intermediate node 400 may also compute whether a time-out threshold has been reached prior to returning to block 420. However, this time-out threshold will be based on whether either a first or second token has been received. In one embodiment, the intermediate node has two time-out thresholds, each being a variable time period based in part on the number of nodes in the network between the intermediate node and the end node. Depending on which one of the thresholds is reached prior to receipt of a new token, the intermediate node may transition to either an orphan node, first end node, or a second end node. For example, on timing-out for first token 150, an intermediate node may transition to operate as a first end node, and on further timing-out for second token 160, the intermediate node transitions to operate as an orphan node. On the other hand, on timing-out for second token 160 first, an intermediate node may transition to operate as a second end node, and on further timing-out for first token 150, the intermediate node transitions to operate as an orphan node.

Figure 5:
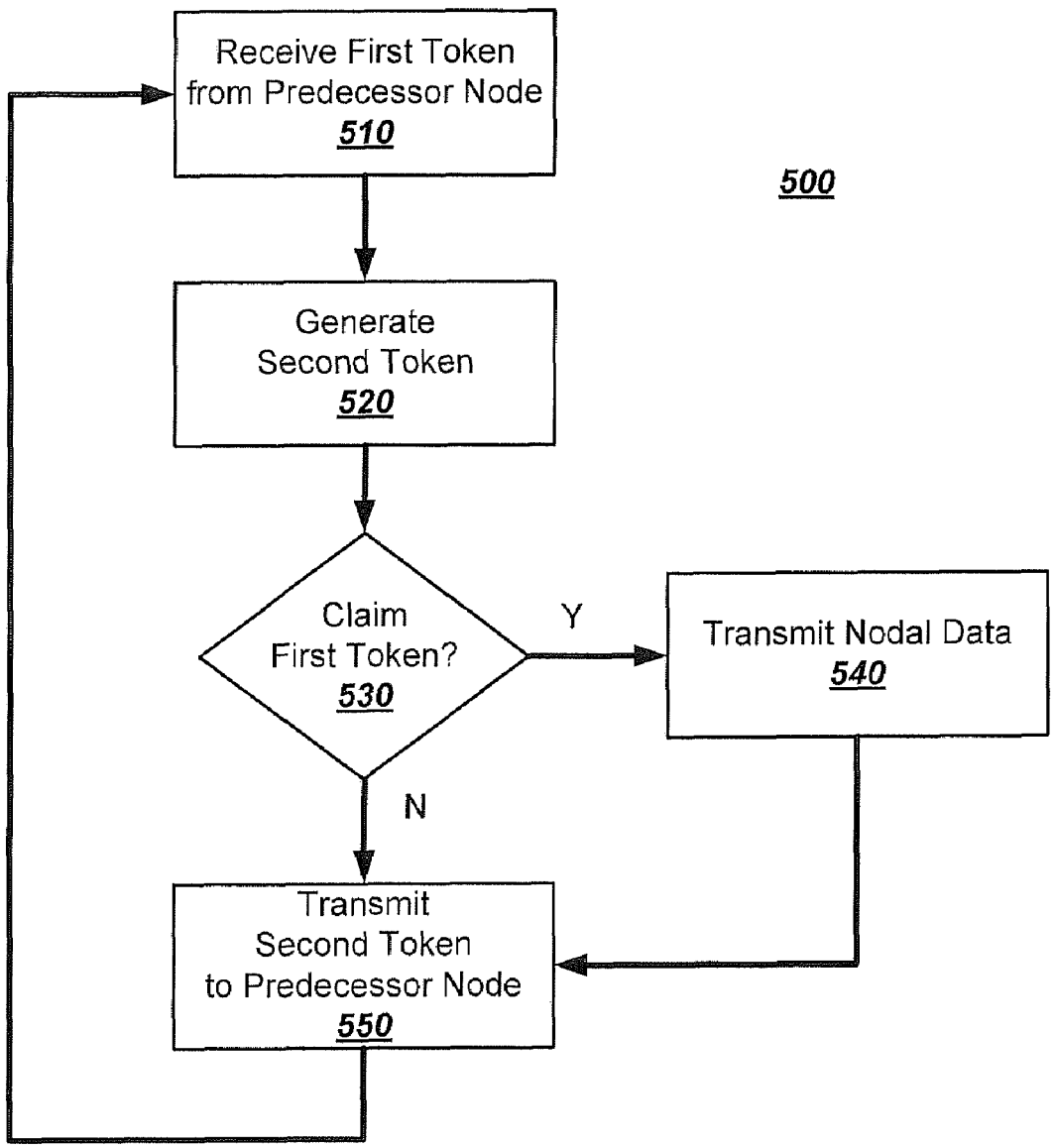
FIG. 5 illustrates a flowchart view of a portion of the operations of a second end node as presented in FIG. 1 in further detail, in accordance with various embodiments.

Referring now to FIG. 5, a flow chart of a portion of operations of a second end node 500 in accordance with various embodiments is shown. The second end node 500 receives a first token from a predecessor node in block 510. In one embodiment, delivery of the first token to the second end node selectively initiates data communication for the last node in one round of data communication. If the second end node does not receive a token within a given time-out threshold, one embodiment is configured so the second end node 500 would transition to an orphan node. Alternatively, the second end node 500 could automatically generate a second token when a given time-out threshold, based in part on the number of known active nodes in the network, is reached, so long as the first end node is not configured to automatically generate a first token.

Upon receipt of the first token, the second end node 500 generates a second token in block 520. The second token may then be used to notify the first end node that a new round of communication may be initiated. In one configuration, the second token may not be claimed by intermediate nodes and is transmitted to the predecessor node. Once the second token reaches the first end node, a new first token will be generated as previously described in FIG. 3.

In addition to generating the second token, the second end node 500 may also determine whether nodal data is available to be transmitted to the other active nodes in the physically segmented logical token network. In query block 530, the second end node 500 consumes the first token, regardless of whether nodal data is available to be transmitted from the second end node 500. In one embodiment, the nodal data from the second end node 500 is appended to the packet containing the second token for transmission in block 540. Alternatively, the nodal data from the second end node 500 could also be sent in a packet prior to the transmission of the second token. Accordingly, regardless of whether supplemental data has been attached by the second end node 500, the second token is transmitted to the predecessor node of the second end node in block 550.

Upon completion of transmission of the second token, the second end node 500 awaits receipt of the first token from the predecessor node in block 510. In various embodiments, the second end node 500 also includes timing modules to identify the range of anticipated arrival times of the next first token. If the next first token does not arrive within the calculated time period, the second end node 500 may optionally generate another second token in accordance with one embodiment. Alternatively, upon expiration of the response timer, the second end node 500 may optionally designate itself as an orphan node.

Figure 6:
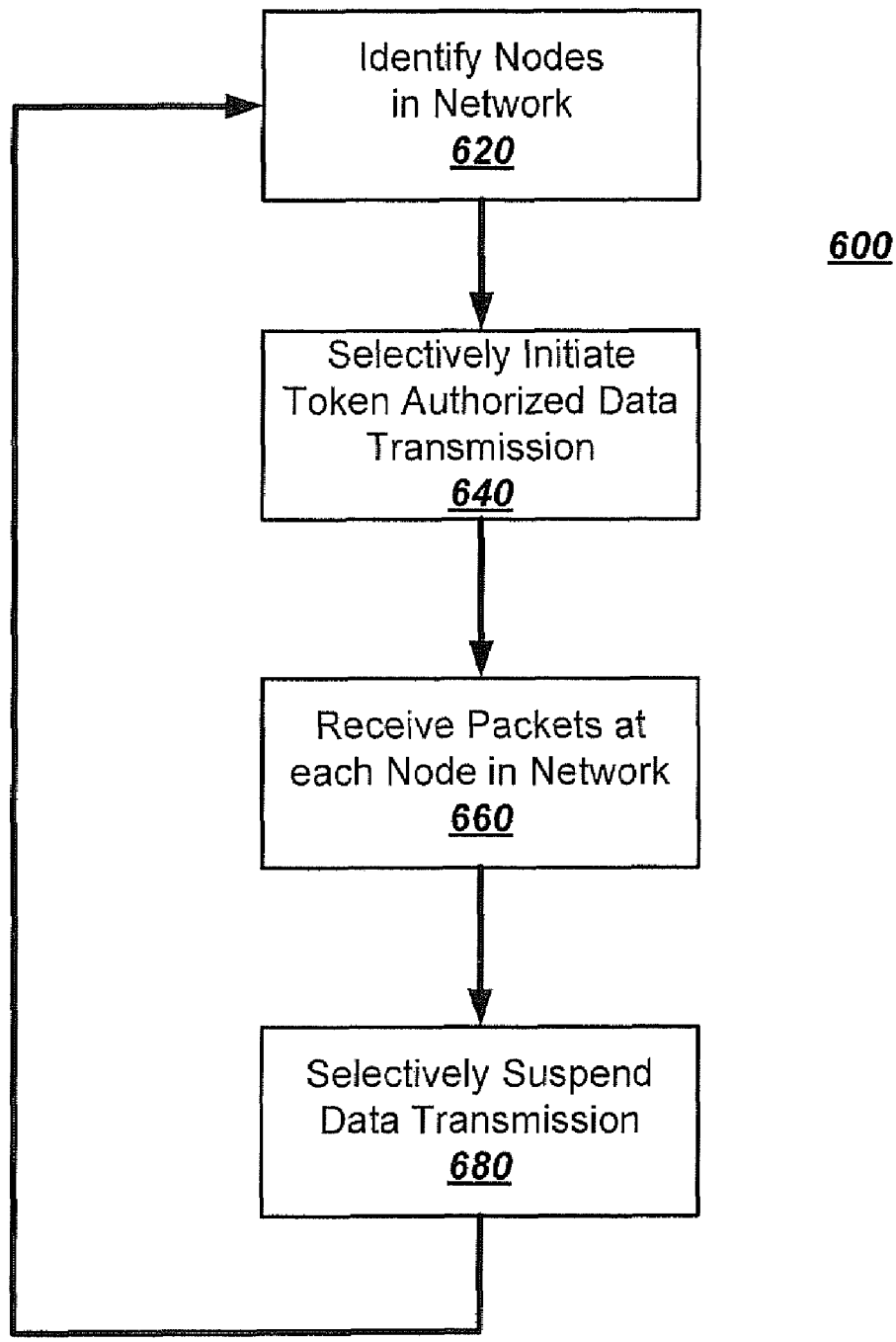
FIG. 6 illustrates a flowchart view of a portion of the operations of a physically segmented logical token network in accordance with various embodiments.

Referring to FIG. 6, a flowchart of a portion of operations of a physically segmented logical token network in accordance with various embodiments is shown. A network communication arrangement 600 identifies the active and connected network nodes in the network in block 620. In various embodiments, the network communication arrangement 600 may include a first end node, an intermediate node, a second end node, and at least one transmission segment directly connected to the first end node. In accordance with a further feature of at least one embodiment, the intermediate node directly connects to a first transmission segment directly connected to the first end node. In accordance with an additional feature, a second transmission segment is serially coupled to the intermediate node and is directly connected to the second end node. In one embodiment, the first and second end nodes are the only nodes of the communication arrangement. Each of the intermediate and end nodes includes logic configured to enable the nodes to communicate with each other in accordance with a communication protocol that provides for each node to receive each communication initiated by each other node, independent of whether a node is an intended recipient of a communication.

In accordance with a further aspect of at least one embodiment, the network communication arrangement 600 may also include another intermediate node and a third transmission segment directly connecting the other intermediate node to the intermediate node. The second transmission segment may be serially coupled to the intermediate node through the other intermediate node and the third transmission segment. The other intermediate node also includes logic configured to enable the other intermediate node to communicate with the other nodes in accordance with the communication protocol. Accordingly, in one embodiment, the network communication arrangement 600 may incorporate multiple transmission segments and associated intermediate nodes.

Alternatively, the second transmission segment may be directly connected to the intermediate node. In yet another alternative configuration of the network communication arrangement 600, there is only one intermediate node. Additionally, the one intermediate node may also be the second end node so that the second end node is immediately coupled to the first end node.

As previously discussed, networking in harsh mechanical environments often affects the reliability of a network and may also affect the availability of specific nodes. As such, at any given time, the network communication arrangement 600 may lose some of the network nodes when they become communicatively disconnected from its neighboring nodes. The disconnected nodes become orphan nodes. In one embodiment, the network communication arrangement 600 attempts to reconnect with various orphan nodes during the network identification process in block 620. For example, in a downhole physically segmented logical token network, the second end node, which may in one configuration be located at or near the bottom of the connected nodes in the drill string, may attempt to transmit a packet down to a potential successor node. If a response is received, the second end node would become an intermediate node and the successor node would become the new second end node. By repeating this process, the network can rebuild itself, for example, when a drill segment is added at the top of the downhole assembly.

Once the network communication arrangement 600 has identified its members, selective token authorized data transmission may be initiated in block 640. In one embodiment, the first and second end nodes and the at least one intermediate node employ at least a first and a second token to facilitate communication among the nodes. For example, the first token may be employed to authorize an intermediate node to transmit data to at least one immediately coupled node during communication. The second token may be employed to defer new data communication until another first token is transmitted. Thus, in various embodiments the first end node is adapted to generate and transmit the first token to the immediately coupled intermediate node and the second end node is adapted to generate and transmit the second token.

Each node in the network communication arrangement 600 receives the transmitted data packets in block 660. Accordingly, each intermediate node is adapted to receive the first token from a predecessor immediately coupled node and to transmit the first token to a successor immediately coupled node. In this manner, although the network 600 is physically segmented, each node is logically consistent with its neighbors.

In block 680, the network 600 may selectively defer/suspend new data transmissions until the nodes of the network are identified in block 620 and token authorized data transmission is selectively initiated again in block 640. In one embodiment, the act of transmitting a second token from a second end node serially to the first end node will quickly identify the network.

In a downhole network, the selective suspensions in block 680 may be a useful way of conserving battery life in the nodes while the network is unavailable. For example, selective suspension of new data transmission in the network when a segment is added to and/or removed from the drill string will preserve battery life by ensuring that unnecessary transmissions that would need to be repeated later are not made, especially when the desired destination may be temporarily disconnected from the network. This deferral will also ensure that the network nodes do not attempt to transmit data until the network is operational so that each node is able to receive the transmitted data. Alternatively, in a computer network, when a critical resource is temporarily disconnected for servicing, the nodes can suspend transmissions until the network is restored.

Additional situations where the suspension of data transmissions might be useful include embodiments where tokens are used to facilitate communications. For example, in a system configured to equalize the number of opportunities by each node to transmit data on the network, a second token generated and transmitted by a second end node may represent the mechanism through which new data transmissions may be suspended until a new first token is generated by a first end node. In one configuration, where the second token may only be claimed by the first end node, the token will be quickly passed from the second end node back to the first end node. Each intermediate node is configured to receive the second token from a successor immediately coupled node and to automatically transmit the second token to a predecessor immediately coupled node. Once the second token reaches the first end node from the immediately coupled intermediate node, the first end node generates and transmits a new first token to selectively initiate token authorized data transmission to the immediately coupled intermediate node in response.

Figure 7:
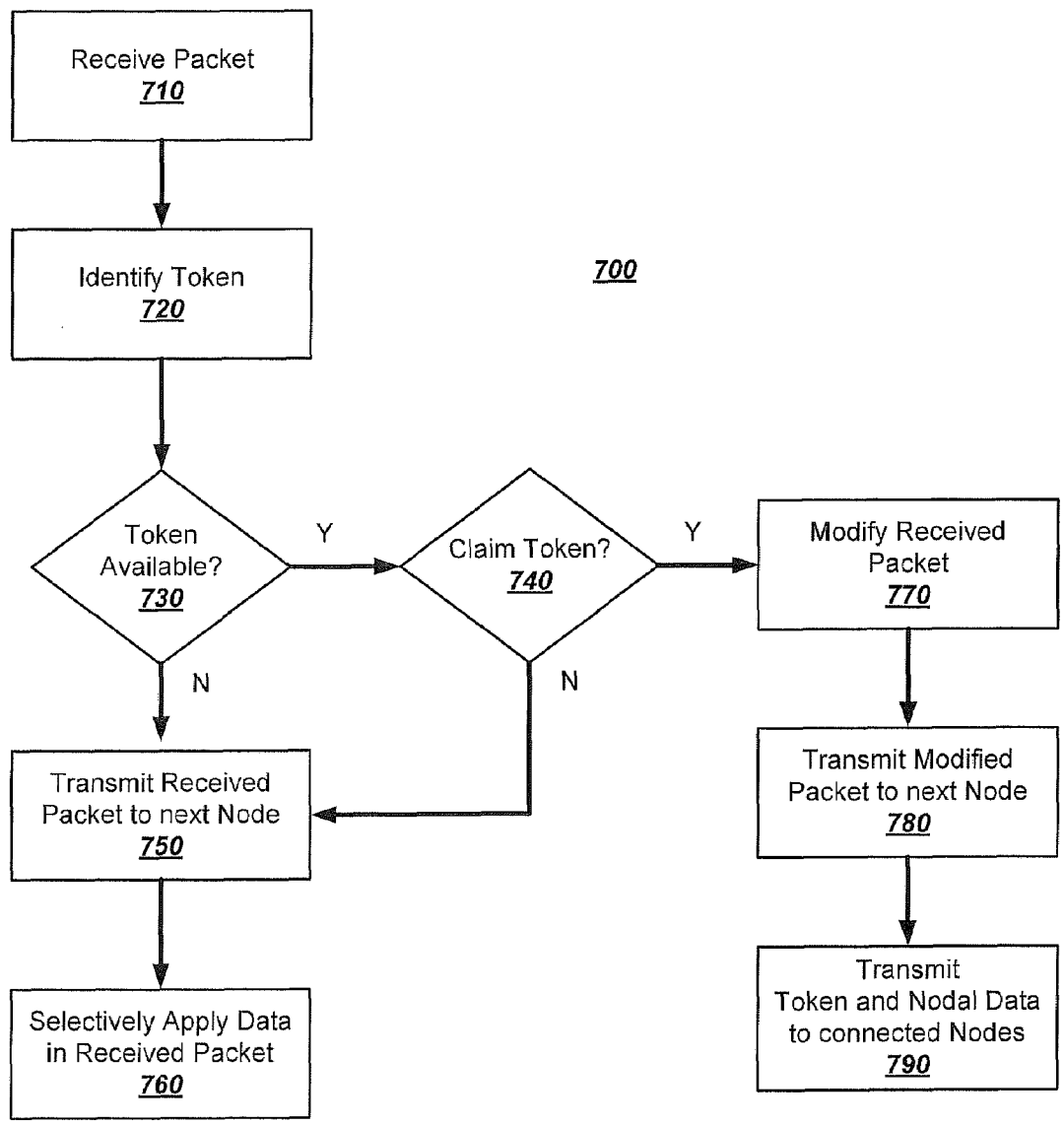
FIG. 7 illustrates a flowchart view of a portion of the operations of a network node in accordance with various embodiments.

Referring to FIG. 7, a flow chart of a portion of operations of a networking node 700 in accordance with various embodiments is shown. In block 710, the networking node 700 receives a packet from a neighboring node. In block 720, the networking node 700 identifies a token associated with the received packet. In one embodiment, such as where the token is contained in the first few bits of the packet header, the token identification may occur before the entire packet is received. The networking node 700 determines whether a token is available to be claimed by the networking node 700 at query block 730. Should the networking node 700 determine that the token is available, networking node 700 may also indicate whether to claim the available token in query block 740. In many configurations, the request to claim the token has been previously determined based in part on whether nodal data assembled at the networking node 700 is ready to be transmitted to the other network nodes. If the networking node 700 determines that either the token is unavailable or not to claim the token, the packet originally received in block 710 is transmitted to the next node by the networking node 700 in block 750. In one embodiment, the networking node 700 may modify the header of the packet (e.g., increasing the hop count) without changing the payload of the packet prior to transmission in block 750.

Upon receipt of the packet in block 710, the networking node 700 analyzes the received packet and in block 760 selectively verifies and applies the data in the received packet to the networking node. In a downhole configuration as illustrated in FIG. 8, verification of data contained within the packet may be delayed until processing of the data due to the nature of the network. In one embodiment, the application of the data within the packet may occur concurrently with the transmission of the packet to the next node. For example, if portions of the packet are determined to include information directed to the network node 700 then the relevant portions can be automatically distributed to the local components.

If the networking node 700 claims the available token in query block 740, a process to modify the originally received packet is initiated in block 770. This modification may involve removing the token from the header of the received packet and/or altering the token header to identify that the network node 700 has claimed the token. In block 780, the network node 700 transmits the modified packet to the next node. Following this transmission in block 780, the networking node 700 will then be the next node to transmit new application data to the network. Once the packet has been generated by the networking node 700, the token and nodal data are transmitted to all nodes connected to the networking node in block 790.

In one embodiment, using a downhole physically segmented logical token network having a plurality of networking nodes 700, each networking node 700 may receive a packet from above or below. This directional nature may also be a factor in determining whether a token is available or not. For example, if a first end node is the only source of a valid first token, then a first token received from the side coupled to the second end node is not a legitimate first token. A second token received from the side coupled to the first end node is not a legitimate second token if the second end node is the only source of a valid second token.

In one embodiment, when the networking node 700 receives a packet from a certain direction, such as below the networking node 700, the received token may be assumed to not be available in block 730 due to the source of the packet. In this case, the packet may be passed on to the next node and the packet data may be selectively applied to the networking node 700. Alternatively, when the packet is received from the other direction, such as above the networking node 700, the token availability is determined in block 730 by the networking node 700. Depending on whether the token is available and whether the network node desires to claim the token, the networking node 700 may transmit the received packet in either a modified form or the original form. When the networking node 700 claims a token in query block 740, the subsequent transmission by the networking node 700 in block 790 is directed in both directions, in contrast to the transmission of the received packet in 750, which merely transmits the received packet to the next node with only minor modifications to the header of the received packet such as increasing the packet hop count.

When drilling boreholes into earthen formations, a drilling operation 800 as shown in FIG. 8 may be used. The drilling operation 800 may include a drilling rig 805, an integrated downhole physically segmented logical token network 810, and a tubular drill string 860 having a bottom hole assembly 880. The bottom hole assembly 880 typically forms the bottom of the drill string 860, which is typically rotatably driven by a drilling rig 805 from the surface. In addition to providing motive force for rotating the drill string 860, the drilling rig 805 also supplies a drilling fluid under pressure through the tubular drill string 860 to the bottom hole assembly 880. Other components of the bottom hole assembly 880 include a drill collar 875, a drill bit 890, and various other downhole components. In operation, the drill bit 890 is rotated and weight is applied. This action forces the drill bit 890 into the earth, and as the bit is rotated, a drilling action is effected.

The downhole physically segmented logical token network 810 includes a first end node and/or a top node 820, a plurality of transmission segments integrated into the drill pipe 870, a plurality of intermediate nodes and/or middle nodes 830 and 840, and the second end node and/or a bottom node 850. The downhole network 810 provides an electrical interconnection between the top node 820 and the bottom node 850. The top node 820 may, in accordance with at least one embodiment, be a component of a server 815. The server 815 is positioned near the top of the well in one embodiment and may relay reconstituted well information gathered from various components in the downhole network 810 to a variety of interested client computing devices across an area network, such as the Internet, using methods currently known in the art.

The downhole network 810 operates similar to the previously described network of FIG. 1, although features may be described in a more directional nature. For example, in a downhole network 810 a first token may be a down-token, and a second token may be an up-token. As such, the down-token is a logical token generated by the top node 820 that the individual nodes (830, 840, and 850) are cyclically and/or periodically allowed to claim. In one embodiment that tries to equalize the number of transmission opportunities for each node, the up-token is a logical token that only the top node 820 is allowed to claim.

Although the down-token has been characterized in one embodiment to be an equivalent to the first token and the up-token is characterized as an equivalent to the second token, it is clear to one of skill in the art that other characterizations are possible and considered within the scope of the instant invention. For example, the roles of the up and down tokens could be reversed. Moreover, the up-token and the down-token could be the same logical token. In such a configuration, a directional modifier may be assigned at each node based in part on which communication interface received the token.

As previously indicated, a downhole network 810 is often a discontinuous operating environment. For example, as the well increases in depth, new tubular drill pipe is added to the drill string below the top node 820, temporarily interrupting data communications between the nodes. Additionally, portions of the drill string may become temporarily unavailable due to mechanical stresses related to drilling operations. As a result, in one embodiment each intermediate node (830 and 840) may become the bottom node 850 when no data and/or token is received from a successor immediately coupled node for a designated time period based in part on the number of nodes in the downhole network 810. In various embodiments, the top node 820 is configured to selectively generate another down-token even if the up-token is not received within a designated time period, where the designated time period is based in part on the number of known active nodes in the downhole network.

Figure 9:
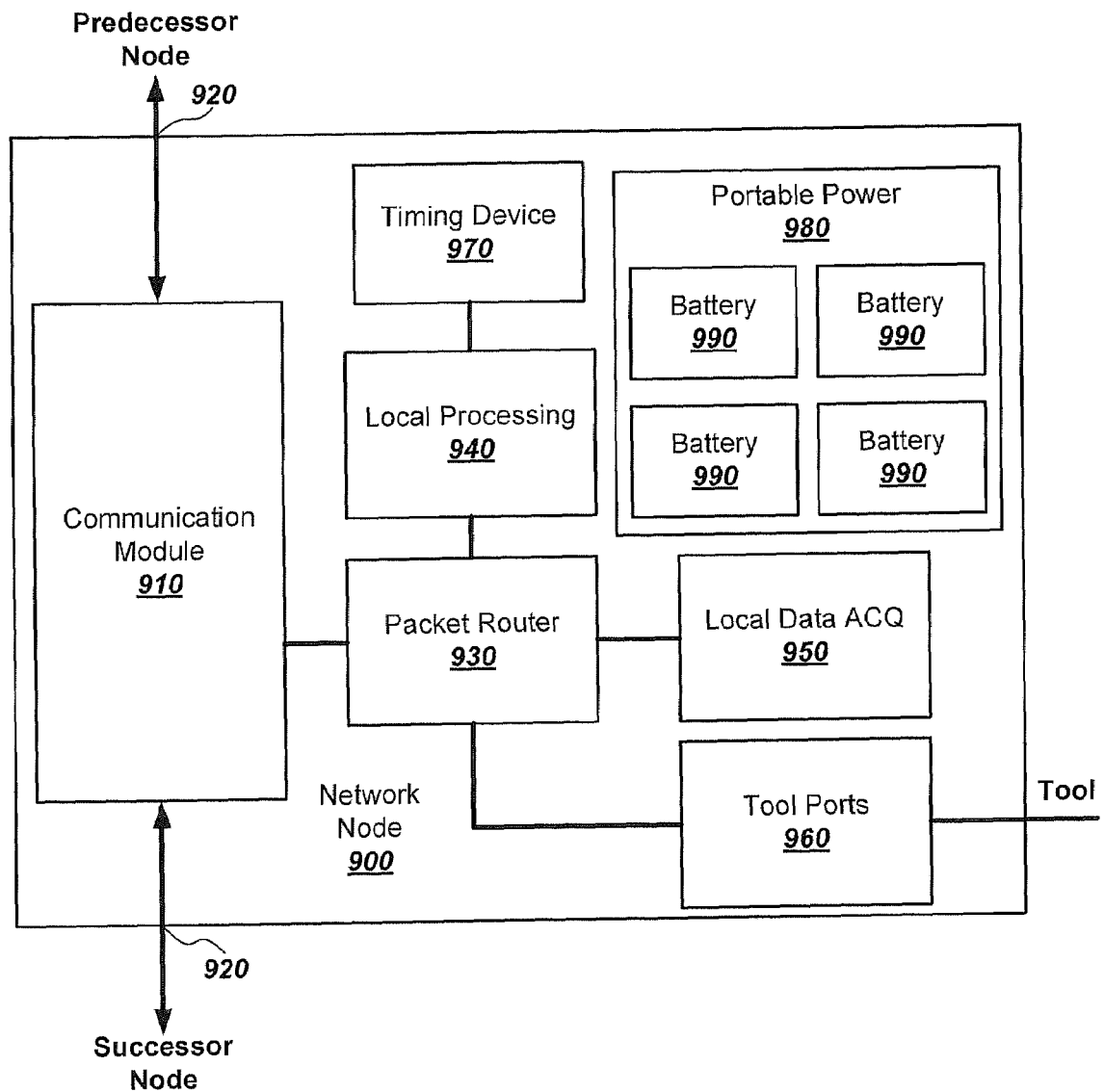
FIG. 9 illustrates a network node suitable for practicing various embodiments of the present invention as presented in FIG. 8 in further detail, in accordance with various embodiments.

Other modifications may also be made to each network node (820, 830, 840, and 850) in the downhole network 810 to facilitate data processing and data communication. An exemplary downhole network node 900 suitable for practicing various embodiments as presented in FIG. 8 is shown in FIG. 9. The downhole network node 900 includes at least one communication interface 920, a communication module 910, a packet router 930, a local processing module 940, and a local data acquisition module 950 as previously described in relation to FIG. 2. The downhole network node 900 includes a peripheral tool port 960, similar to the peripheral port 260, that allows the downhole network node 900 to collect data from an associated tool to packetize the tool data, and to transmit it to the top of the well. As previously indicated, a downhole network node 900 may also employ a timing device 970 to calculate whether time-out thresholds have been reached as previously described in FIGS. 3, 4, and 5.

In one embodiment, a downhole network node 900 includes a suitable portable power source 980. Often the downhole network node 900 will need to be self-reliant on multiple battery packs 990 for power requirements. These battery packs 990 may even be allocated to the downhole network node 900 based on the function. For example, a portion of the battery packs 990 could be dedicated to transmitting received packets to the next node. Another portion could be dedicated to maintaining the local processing 940 and related components (930, 950, 960, and 970). In one embodiment, the tool may either draw power from the node or provide a source to recharge the batteries.

Although specific embodiments have been illustrated and described herein, it will be appreciated by those of ordinary skill in the art and others, that a wide variety of alternate and/or equivalent implementations may be substituted for the specific embodiment previously shown and described without departing from the scope of the present invention. For example, the network 1000 in FIG. 10 could implement the described physically segmented logical token network. Where a computing device 1010 could operate as a first end node generating a first token 1040 and a client computing device 1030 could operate as a second end node generating a second token 1050. The computing device 1010 and the client computing device 1030 may include general and/or special purpose computing devices, such as a desktop computer, a personal digital assistant (PDA), a server, and/or console suitably configured for practicing the present invention in accordance with at least one embodiment.

The various network devices 1020 could function as intermediate nodes, wherein network devices 1020a (e.g., a router) and 1020b (e.g., a bridge) forward packets between the computing device 1010 and the client computing device 1030 and network device 1020b selectively forwards packets received from one predecessor router 1020a to the appropriate successor network device 1020c. In this manner, a virtual private network implementing the physically segmented logical token network could be established between the computing device 1010 and the client computing device 1030.

Thus, a wide variety of alternate and/or equivalent implementations may be substituted for the specific embodiments shown and previously described without departing from the scope of the present invention. This application is intended to cover any adaptations or variations of the embodiments discussed herein. Therefore, it is manifested and intended that the invention be limited only by the claims and the equivalents thereof.

Whereas the present invention has been described in particular relation to the drawings attached hereto, it should be understood that other and further modifications apart from those shown or suggested herein, may be made within the scope and spirit of the present invention.

What is claimed is:

1. An apparatus comprising:
  a first end node;
  a first transmission segment directly connected to the first end node;
  at least one intermediate node directly connected to the first transmission segment;
  a second transmission segment directly connected to the at least one intermediate node; and
  a second end node directly connected to the second transmission segment;
  wherein the first and second end nodes are the only end nodes of; and
  wherein each of the intermediate and end nodes includes logic configured to enable the nodes to communicate with each other in accordance with a communication protocol that provides for each node to receive each communication initiated by each node, independent of whether a node is an intended recipient of a communication;
  wherein the first end node is a top node, the second end node is a bottom node, a first token is a down-token, and a second token is an up-token in a downhole network associated with a drill string, the downhole network formed by a plurality of store and forward nodes coupled together in a hierarchal physically segmented logical token configuration;
  wherein each intermediate node is configured to become the bottom node when no data and/or token is received from a successor immediately coupled node for a designated time period based in part on the number of nodes in the downhole network.

2. The apparatus of claim 1, wherein the first and second end nodes and the at least one intermediate node employ at least a first and a second token to facilitate communication among the nodes.

3. The apparatus of claim 2, wherein the first token is employed to authorize an intermediate node to transmit data to at least one immediately coupled node during communication, and the second token is employed to start a new iteration of data communication.

4. The apparatus of claim 3, wherein the first end node is adapted to generate and transmit the first token to the immediately coupled intermediate node.

5. The apparatus of claim 3, wherein each intermediate node is adapted to receive the first token from a predecessor immediately coupled node, and transmit the first token to a successor immediately coupled node.

6. The apparatus of claim 5, wherein each intermediate node is further adapted to selectively transmit data to at least one immediately coupled node in response to receipt of the first token.

7. The apparatus of claim 6, wherein upon receipt of the first token, each intermediate node is conditionally adapted to transmit the first token to a successor immediately coupled node with or after the transmitted data of the intermediate node.

8. The apparatus of claim 6, wherein the selectively transmitted data of the intermediate node is systematically received by all nodes in a hierarchal physically segmented logical token downhole network.

9. The apparatus of claim 5, wherein the second end node is adapted to receive the first token from an immediately coupled intermediate node and, in response, generate and transmit the second token to the immediately coupled intermediate node.

10. The apparatus of claim 9, wherein each intermediate node is adapted to receive the second token from a successor immediately coupled node, and transmit the second token to a predecessor immediately coupled node.

11. The apparatus of claim 10, wherein the first end node is adapted to receive the second token from an immediately coupled intermediate node and, in response, generate and transmit a new first token to the immediately coupled intermediate node.

12. The apparatus of claim 1, wherein the down-token is a logical token that the individual nodes are cyclically and/or periodically allowed to claim.

13. The apparatus of claim 1, wherein the up-token is a logical token that only the top node is allowed to claim.

14. The apparatus of claim 1, wherein the top node is configured to selectively generate another down-token if the up-token is not received within a designated time period based in part on the number of nodes in the downhole network.

15. The apparatus of claim 1, wherein each intermediate node is coupled to only one predecessor node and to only one successor node.

* * * * *